US005474742A

United States Patent [19]

Tuuminen

[11] Patent Number: 5,474,742

[45] Date of Patent: Dec. 12, 1995

[54] APPARATUS FOR REMOVING SOLID BODIES FROM AN ARRAY OF REACTION VESSELS

[75] Inventor: Tamara Tuuminen, Helsinki, Finland

[73] Assignee: Labsystems Oy, Helsinki, Finland

[21] Appl. No.: 393,509

[22] Filed: Feb. 23, 1995

Related U.S. Application Data

[63] Continuation of Ser. No. 74,323, Jun. 9, 1993, abandoned.

[30] Foreign Application Priority Data

Jun. 10, 1992 [FI] Finland .................................... 922687

[51] Int. Cl.$^{6}$ .................................................... G01N 35/02

[52] U.S. Cl. ............................ 422/63; 422/57; 422/68.1; 422/65

[58] Field of Search ................................ 422/56, 57, 63, 422/68.1, 65; 436/48

[56] References Cited

U.S. PATENT DOCUMENTS

| | | | |
|---|---|---|---|
| 4,200,613 | 4/1980 | Alfrey et al. | 422/71 |
| 4,482,521 | 11/1984 | Bunce et al. | 422/102 |
| 4,937,048 | 6/1990 | Sakai et al. | 422/63 |

FOREIGN PATENT DOCUMENTS

| | | |
|---|---|---|
| 0078225 | 5/1983 | European Pat. Off. . |
| 0154687 | 9/1985 | European Pat. Off. . |
| 5052843 | 3/1993 | Japan . |
| 8907763 | 8/1989 | WIPO . |

*Primary Examiner*—Steven Weinstein
*Assistant Examiner*—Milton I. Cano
*Attorney, Agent, or Firm*—Volpe and Koenig

[57] ABSTRACT

An apparatus for removing solid bodies from an array of reaction vessels includes a frame and a plurality of lifters, each lifter for holding a solid body disposed within a reaction vessel for removal therefrom. The lifters are mounted on the frame in an array corresponding to the array of reaction vessels such that the array of lifters is positionable within the array of vessels in a manner which permits placement of a solid body in each vessel on each lifter while the lifters are positioned in the vessels.

9 Claims, 2 Drawing Sheets

APPARATUS FOR REMOVING SOLID BODIES FROM AN ARRAY OF REACTION VESSELS

This application is a continuation of application Ser. No. 08/074,323, filed Jun. 9, 1993 now abandoned.

FIELD OF INVENTION

The invention relates to an auxiliary device to be used in a laboratory, by means of which device a solid body in a reaction vessel can be removed.

PRIOR ART

In several countries, analyses are made as a routine measure from a blood sample taken from all newborn babies, so that certain illnesses (e.g. insufficiency of thyroid gland) could be followed and treated as early as possible. The amounts of samples are naturally very large and it is most advantageous to analyze them in large series, whereby it is possible to reach as high a level of automation as possible.

A blood sample for the above-mentioned analyses is usually taken by absorption onto a filter paper, whereby its storage and dispatch to a laboratory performing the analyses is easy. In the laboratory, a small disk (diameter ca. 3–5 mm) is punched off the filter paper, from which disk the sample is eluted into a solution in a reaction vessel. As a reaction vessel e.g. wells of an 8×12 microtitration plate are used, whereby it is possible to simultaneously perform up to 96 analyses. After the eluation, the disk of paper is removed from the solution or the solution is transferred to other wells for further treatment.

In methods used currently, the disk of paper is usually removed from the reactor vessel by means of a pair of tweezers or a needle. This is already cumbersome as such, and it has to be performed separately for each well. It is also very difficult to press the disk always in exactly the same way, because of which the amount of the fluid leaving the well varies. The use of a needle is on its part still more cumbersome than that of a pair of tweezers.

A suction device has also been used for removing the disks, by means of which device the sheets are removed with suction pipes to be placed in the wells. These methods cannot be used, if the eluation fluid has to remain in the well.

GENERAL DESCRIPTION OF INVENTION

The invented device is meant to be used in sets of cuvettes comprised of several vessels. The device has a framework and therein, at a point corresponding to each vessel, a solid-body lifter positioning in the vessel. All bodies may thus be simultaneously lifted off the vessels in a single step.

DETAILED DESCRIPTION OF INVENTION

The invented device has a framework to be placed in a set of cuvettes, and fixed lifters thereunder. At the lower end of the lifters there is a retainer. The retainer can be especially formed by transverse bars. The device is dimensioned and constructed such that when it is placed on top of a set of cuvettes, e.g. a microtitration plate, intended to be used together therewith, the retainers position in the vessels of the set of cuvettes. The framework contains openings such that the openings provide access to each vessel. In this way, the desired solid body may be taken on the retainer into the vessel for a reaction.

The device is especially applicable to be used in the elution of samples, e.g. blood, urine or excrement samples, absorbed onto a filter paper.

Some preferable applications of the invention are described in the following in more detail. In the drawings of the description:

Figure 1:
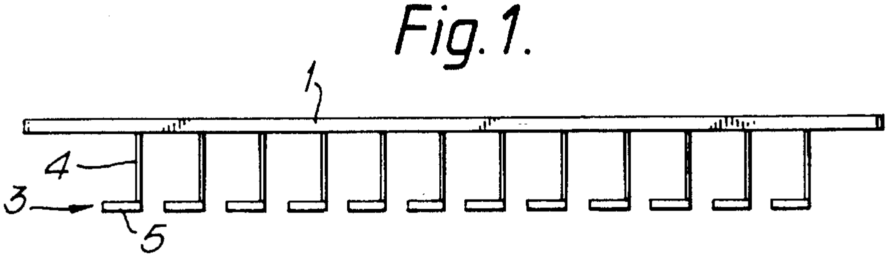
FIG. 1 shows an invented device seen from the front.
Figure 2:
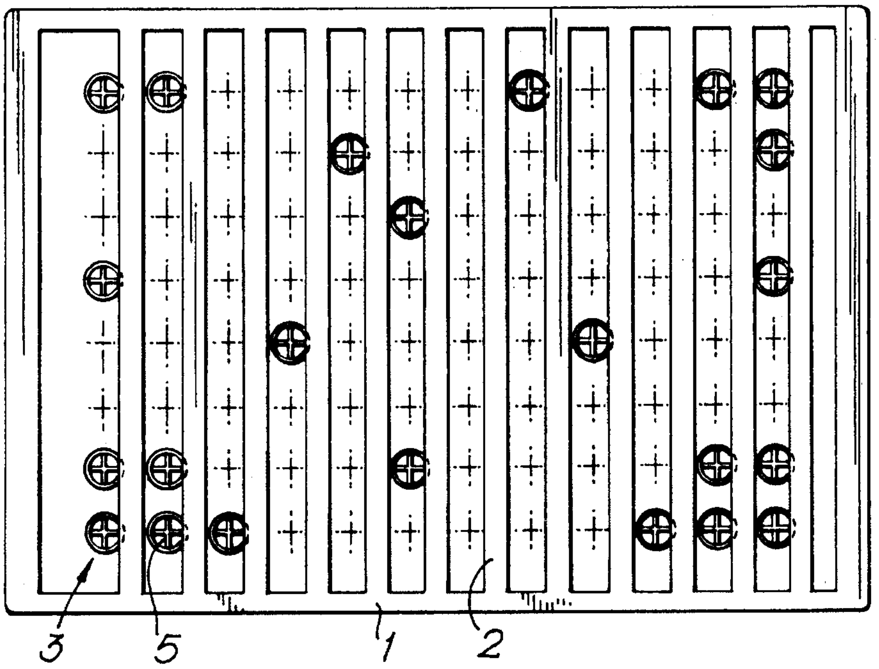
FIG. 2 shows the same device seen from above.

The lifting device of FIGS. 1 and 2 is meant to be used together with 8×12 microtitration plates. The device has a rectangular frame 1. Its long sides are connected with twelve transverse bars 2 corresponding to the spacing of the vertical rows of the plate.

Eight lifters 3 are fixed to each bar 2 corresponding to the spacing of the horizontal rows of the plate. The width of the lifters is smaller than the diameter of the wells of the plate.

The device can be placed on the plate such that the lifters 3 position in the wells of the plate.

The lifter 3 has an arm 4 extending directly downwards from the bar 2 and at its lower end there is located a tongue 5. The tongue is so wide that a filter paper piece of a width of 3–5 mm cannot drop from it to the bottom of the well. The bars 2 and the arms 4 are dimensioned and positioned on the edge of the row of wells such that the paper pieces may be freely placed in the wells.

The tongue 5 has a round ring and in the middle of it a transverse framework. The fluid in the well can thus easily come into contact with the whole piece.

Figure 3:
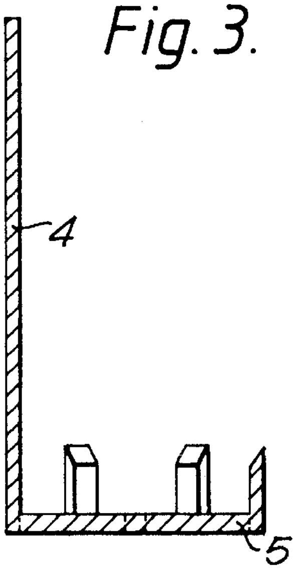
FIG. 3 shows an alternative part of the device from behind as enlarged and cut.

The tongue 5 of FIG. 3 has six radial supports, one of which is fixed to the arm 4. At the end of the other supports there is provided a vertically extending stop, whose upper end is chamfered to slant to the center side of the tongue 5. The stops keep the paper disk well in position. In addition, the fluid comes very well into contact with the paper.

The device is placed on an empty microtitration plate and the paper pieces containing the samples are placed in the wells on the tongues 5, after which an elution solution is dispensed into the wells. After the elution has occurred, the device and all paper pieces together with it are lifted off the wells. The elution solution thus remains in the wells.

Depending on the method, the inner surfaces of the wells may have been coated e.g. with an antibody required in the assay method.

The usage of the device both facilitates and speeds up the performance of the assays. It also increases the repeatability of the assays.

Figure 4:
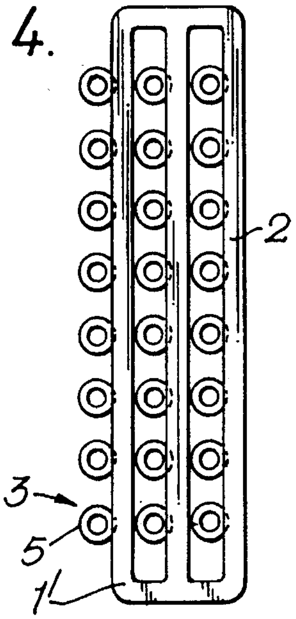
FIG. 4 shows another invented device seen from above.

FIG. 4 shows a smaller device, which is intended to be used, when assays are performed only in some of the wells of microtitration plate (e.g. MICROSTRIP® plates).

The device of FIG. 4 has three transverse bars 2 parallel with the vertical rows of the plate, which bars 2 are connected at their ends by supports 1'. The bars 2 have lifters 3. Here, the tongue 5' of the lifters 3 has a mere ring.

Figure 5:
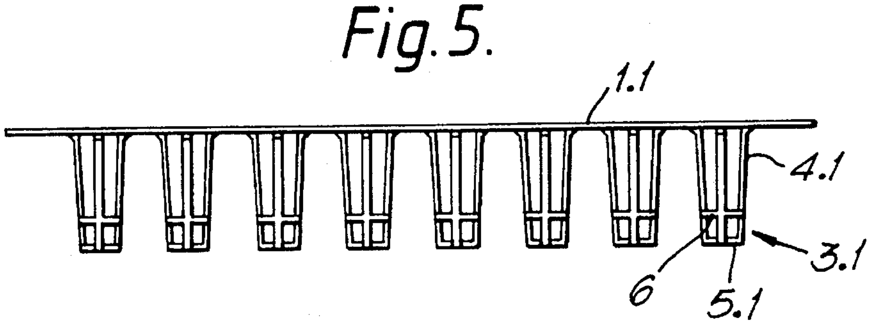
FIG. 5 shows a third invented device shown from the front.
Figure 6:
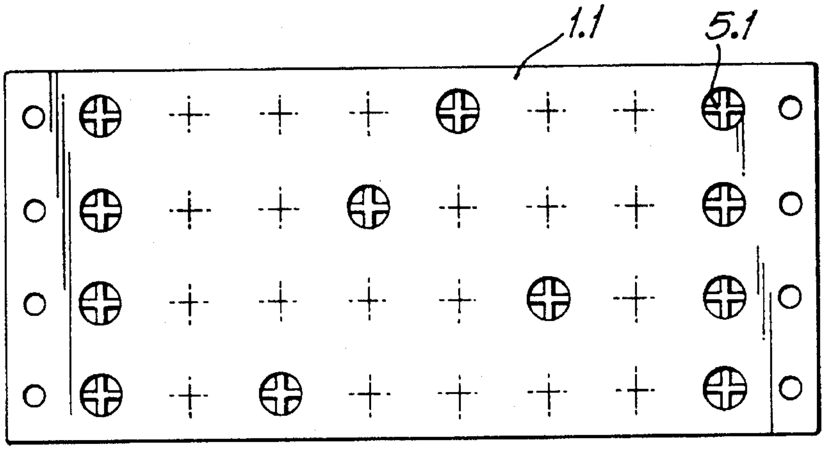
FIG. 6 shows the device of FIG. 5 from above.
Figure 7:
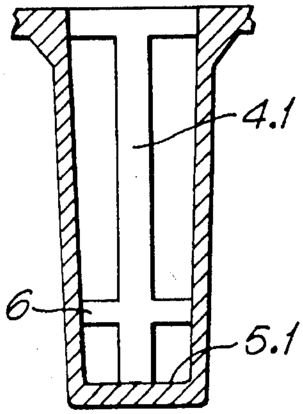
FIG. 7 shows a detail of FIG. 5 as enlarged and cut.

In the embodiment of FIGS. 5–7 there is a rectangular frame plate 1.1 with holes corresponding the places of 8×4 wells in a microtitration plate. On the under side of the frame plate 1.1, at the edge of each hole there are four downwards projecting lifting arms 4.1 to form a lifter 3.1. The under ends of the arms 4.1 are connected transversely by horizontal bars to form a retainer 5.1. The lifting arms 4.1 and the retainer 5.1 term a basket for the solid body. Near the retainer 5.1, the lifting arms 4.1 are further connected with a circular ring 6. This structure is rigid and easy to manufacture. The ring 6 further prevents the solid body such a paper disk from dropping to the well.

The device is most preferably manufactured from a plastic suitable for the application, e.g. polystyrene by injection moulding. A transparent plastic is the most preferable, since e.g. the changing of the color of the fluid in the wells may then be followed as freely as possible.

The device can be used in a similar manner also for removing other solid bodies. Such a body may be e.g. a plastic body used in immunomethods, to the surface of which body has been fixed an antibody or an antigen. The retainer tongue can be formed specially in accordance with the body to be used.

According to one embodiment, the inner surfaces of the wells have been coated with a first reagent, such as antibody, and the retainers with a second reagent. After the elution, a first assay is performed in the wells, and the retainers are transferred into another plate for performing a second assay.

What is claimed is:

1. A remover to be used in a set of cuvettes comprised of an array of reaction vessels into which solid bodies are placed for reaction comprising:

a framework to be placed on a set of cuvettes, said framework having transverse members defining openings in said framework;

a plurality of lifters fixed to said transverse members, each lifter comprising, a vertical arm positioned at a point corresponding to a vessel of said set of cuvettes, said vertical arm having an upper end and a lower end; and a retainer transversely attached to said lower end of said vertical arm for holding a solid body;

whereby said openings allow said solid body to be placed in said retainer of said lifters while said lifters are positioned in the vessels.

2. A remover according to claim 1, wherein there are at least two arms, each arm having a lower end which are connected by horizonal bars to form the retainer.

3. A remover according to claim 2, wherein there are four arms, each arm having a lower end which are connected by transversal bars to form the retainer.

4. A remover according to claim 2, wherein the arms are connected above the retainer by a horizontal support bar.

5. A remover according to claim 1 to be used in a set of cuvettes, which contains an array of reaction vessels in a rectangular matrix, wherein the framework has a rectangular frame comprising a plate with an array of holes corresponding to the array of vessels of the cuvette set, to which frame the lifters have been fixed.

6. A remover according to claim 1, wherein the retainers have been coated with a reagent.

7. A remover according to claim 1, wherein bars comprise said transverse members.

8. A remover according to claim 1, wherein a plate having an array of apertures comprises said transverse members and defined openings.

9. A remover to be used in a set of cuvettes comprised of an array of reaction vessels into which solid bodies are placed for reaction comprising:

a framework to be placed on a set of cuvettes, said framework having bars defining openings between said bars;

a plurality of lifters fixed to said bars, each lifter comprising, a vertical arm positioned at a point corresponding to a vessel of said set of cuvettes, said vertical arm having an upper end and a lower end; and a retainer transversely attached to said lower end of said vertical arm for holding a solid body;

whereby said openings allow said solid body to be placed in said retainer of said lifters While said lifters are positioned in the vessels.

* * * * *